United States Patent
Roth et al.

(10) Patent No.: US 7,922,413 B2
(45) Date of Patent: Apr. 12, 2011

(54) CONNECTING ELEMENT

(75) Inventors: Markus Roth, Giengen (DE); Joachim Barsch, Altheim (DE)

(73) Assignee: Airbus Deutschland GmbH, Hamburg (DE)

( * ) Notice: Subject to any disclaimer, the term of this patent is extended or adjusted under 35 U.S.C. 154(b) by 53 days.

(21) Appl. No.: 10/599,964

(22) PCT Filed: Apr. 18, 2005

(86) PCT No.: PCT/EP2005/004095
§ 371 (c)(1),
(2), (4) Date: Oct. 16, 2006

(87) PCT Pub. No.: WO2005/100802
PCT Pub. Date: Oct. 27, 2005

(65) Prior Publication Data
US 2007/0166098 A1  Jul. 19, 2007

(30) Foreign Application Priority Data
Apr. 17, 2004  (DE) .......................... 10 2004 018 736

(51) Int. Cl.
*F16C 11/00* (2006.01)
(52) U.S. Cl. .......................................... 403/122; 403/59
(58) Field of Classification Search .............. 403/43–48, 403/59, 111, 116, 120, 122, 31; 52/167.4, 52/167.6, 167.8; 108/10, 54.1, 61, 96, 106, 108/144.11; 285/305; 188/155 R; 92/60, 92/583; 248/646, 658, 660, 661, 663
See application file for complete search history.

(56) References Cited

U.S. PATENT DOCUMENTS

| | | | | |
|---|---|---|---|---|
| 3,347,002 A | * | 10/1967 | Penkuhn | 52/167.4 |
| 4,176,428 A | * | 12/1979 | Kimura | 411/509 |
| 4,209,868 A | * | 7/1980 | Tada et al. | 52/167.1 |
| 4,375,864 A | * | 3/1983 | Savage | |
| 5,125,776 A | * | 6/1992 | Muller et al. | 403/31 |
| 5,275,443 A | * | 1/1994 | Klinger | 285/305 |
| 7,168,879 B2 | * | 1/2007 | Bertram et al. | 403/135 |

FOREIGN PATENT DOCUMENTS

| | | |
|---|---|---|
| DE | 29622780 U1 | 8/1997 |
| DE | 10053200 A1 | 5/2002 |
| EP | 0639482 A1 | 2/1995 |
| FR | 2422060 | 11/1979 |
| RU | 958071 | 9/1982 |

* cited by examiner

Primary Examiner — Victor MacArthur
(74) Attorney, Agent, or Firm — Christopher Paradies; Fowler White Boggs P.A.

(57) ABSTRACT

A connection element for attaching components such as trim parts to a structure of an aircraft, includes a retainer on the component, on which retainer an insertion pin is held so as to be adjustable to a limited extent in at least a Z-translational direction in relation to a component surface and mates a receiver coupled to the structure. The receiver has a recess contoured for receiving a trunnion portion of the insertion pin, providing a snap connection between the receiver and the insertion pin. The receiver on the structure includes a support flange, which is capable of coupling with a retainer mounted on the structure such that, the receiver rests flat against the retainer on the structure, and is adjustably held and attachable in a XY-plane that is arranged substantially perpendicularly in relation to the Z-translational direction.

7 Claims, 3 Drawing Sheets

CONNECTING ELEMENT

FIELD OF THE INVENTION

The field relates to a connection element for attaching planiform or dish-shaped components to supporting structures, for example, attaching trim parts, to a structure of an aircraft.

BACKGROUND OF THE INVENTION

In order to fasten planiform or dish shaped components to a supporting structure of an aircraft, normally a large number of connection elements are used. Such connection elements have to meet a host of boundary conditions that conventional fastening elements, known from prior art, such as screws, clamps and rivets are unable to meet. Without establishing a ranking, such boundary conditions include: sound insulation and thermal insulation; light weight of the connection elements; security against unintended disconnection, even during extreme loads, for example as a result of a fire associated with an accident; easy positioning even in the case of difficult installation conditions; and little expenditure of time and tools for connecting and disconnecting, i.e. for attaching and removing the connection elements.

SUMMARY OF THE INVENTION

It is one object of the present invention to create a connection element as described above, which connection element meets the above-mentioned demands, wherein at the same time the construction expenditure and thus the production costs of such a connection element are kept within reason.

According to one example of the invention, a connection element having a retainer on a component, on which retainer an insertion pin is held by a holder such that it is adjustable to a limited extent for example, at least in a Z-translational direction in relation to a component surface and mates a receiver coupled to the structure, where the receiver is of an elastically deformable soft material with a first recess, the first recess being contoured for receiving a trunnion portion of the insertion pin, a snap connection between the receiver and the insertion pin, wherein the receiver includes a support flange, the support flange being capable of coupling with the retainer mounted on the structure such that the receiver rests flat against the retainer on the structure, and is adjustably held and attachable in an XY plane that is arranged substantially perpendicularly in relation to the Z-translational direction.

With the above connection element, the requirements listed above may be met. The design of the connection as a snap connection may ensure that no special tools are required.

The adjustability in the Z-translational direction on the component, and in the XY-direction on the structure may compensate for tolerances between the planiform or dish-shaped components to be attached on the one hand, and the supporting structure of an aircraft on the other hand, wherein such compensation or the corresponding adjustment may take place directly when the connection is manually established. In one example, a component is a trim part for an aircraft. The selection of materials ensures that the entire connection element is comparatively light in weight while providing good thermal insulation, thus meeting a central requirement in aircraft engineering.

In another example of the connection element, the insertion pin is arranged such that when it snaps into the recess of the receiver, it activates mechanical or hydraulic mechanism that firmly clamp the support flange within the retainer mounted on the structure. As a result of this arrangement, the recess in the XY-plane, which may serve as an end attachment position and may be the final attachment position at the same time as the insertion pin snaps into place. Thus, securing the desired position of the retainer on the structure on the one hand, and attaching the insertion pin on the component on the other hand, does not occur in steps but instead concurrently.

In a further example of the connection element, the receiver comprises two recesses for the insertion pin, which recesses are spaced apart from each other in the Z-translational direction. This arrangement may have an advantage in that first, the insertion pin may be inserted into the first of the two recesses; in that in this first position, positioning of the retainer on the structure may be carried out by installing personnel; and in that the second recess is contoured for receiving a trunnion portion of the insertion pin. The second recess may be disposed at a distance from the first recess in the Z-translational direction.

A further example of a connection element allows the adjustability of the insertion pin in the Z-translational direction by a screw thread. As a result of this, the retaining force acting onto the component to be attached may be adjusted within certain limits. The screw thread may preferably be arranged between the retainer on the component and an anchorage part which may be coupled to the insertion pin.

A further example, in the insertion pin is coupled with the anchorage part by a ball joint, provides ease of positioning of the retainer on the structure.

Finally, a further example should be pointed out. The receiver may include anchorages, through which anchorages, a U-shaped clamp may be inserted into the anchorage, such that the trunnion portion of the insertion pin is capable of being secured in the first recess. The spacing of the U-limbs matches the diameter of the base of the insertion trunnion such that it is not possible to pull the insertion trunnion out while the securing clamp is in place. Such arrangement of the connection element ensures the fail-safe behaviour of the connection element in that, even if the receiver on the structure has been destroyed by excessive forces or excessive temperature, e.g. as a result of a fire, the connection between the component and the structure may not become fully undone. In the case of an aircraft, this is of great importance because danger to the passengers must be avoided under any circumstances, for example, danger in the passenger compartment as a result of parts that come undone due to unforeseen damage to the connection element or elements.

BRIEF DESCRIPTION OF THE FIGURES

The drawings describe some examples of a connection element, as shown.

DETAILED DESCRIPTION

The examples described and drawings rendered are illustrative and are not to be read as limiting the scope of the invention as it is defined by the appended claims.

Figure 1:
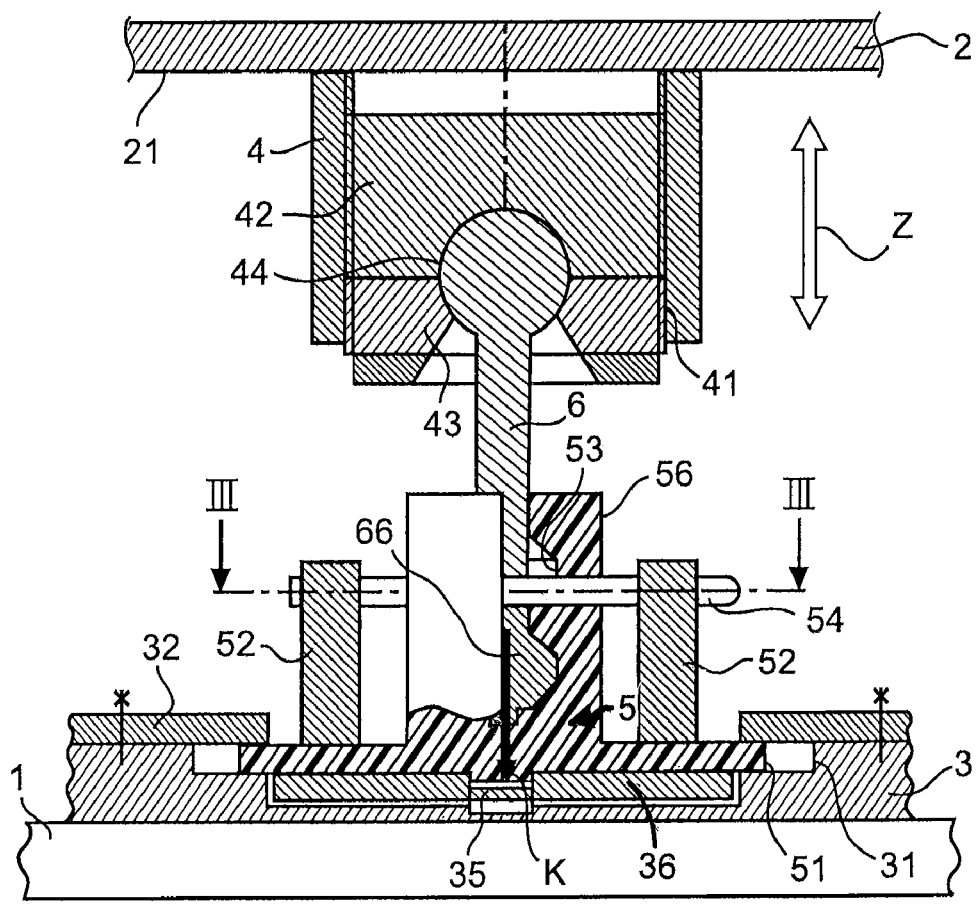
FIG. 1 shows a diagrammatic view of a section of a connection, established with a connection element, between a component and the structure of an aircraft.

The diagrammatic section view according to FIG. 1 shows the attachment of a component 2 to the structure 1 of an aircraft. Attachment takes place by means of a connection element which comprises a retainer 4 in the form of a cylindrical sleeve, which in turn is attached to the surface 21 of the 2. In one example, the component is a trim part, the inside of the retainer 4 on the component comprises a thread 41, into which thread an anchorage part 42, has been screwed. In a ball socket 44 of the anchorage part 42 the spherical head of an insertion pin 6 is held and secured by means of a trunnion retainer 43. The insertion pin 6 may thus be swivelled, to a limited extent, in the ball joint created. By screwing the thread 41 in or out, the position of the insertion pin 6 in Z-translational direction may be adjusted. The lower end of the insertion pin 6 thus forms a base 66 that slopes on both ends and that has an increased diameter. In the position as shown in FIG. 1, this base 66 is held (position 2), having positive fit, in the lower of two identically designed recesses 53 of a cylindrical body 56, which receiver 5 in its entirety is designated the receiver on the structure.

On the cylindrical body 56 of the receiver 5, a support flange 51 adjoins downwards, which support flange 51 adjoins over an area in a flat recess 31 of a retainer 3 on the structure and is secured to the retainer 3 on the structure by means of a retaining plate 32. The depth of the flat recess 31 is slightly larger than the depth of the support flange 51. In position 1 as shown in FIG. 1 the receiver 5 on the structure has been firmly clamped over the support flange 51 in the retainer 3 on the structure, which takes place in that a pin 65 at the bottom end of the insertion pin 6 (compare FIG. 5), according to the shown line of application of a force K, by way of an intermediate pin 55 of the receiver 5, activates a mechanical or hydraulic device 35 which in turn, along the path of application 36, exerts a clamping force on the support flange 51 against the retaining plate 32.

Figure 2:
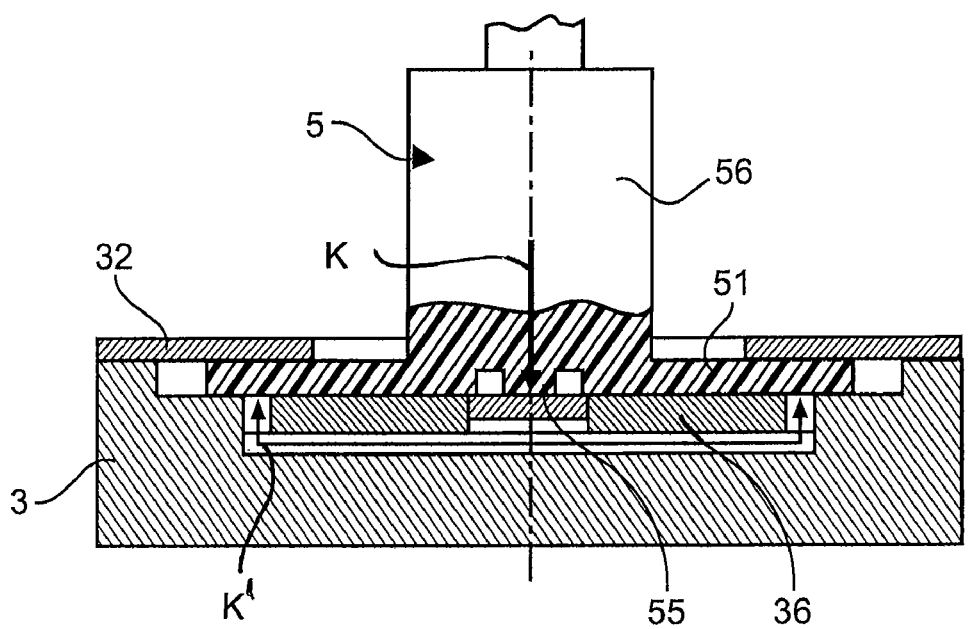
FIG. 2 shows a diagrammatic view of the introduction of the clamping force for firmly clamping the retainer to the structure.

FIG. 2 diagrammatically shows the introduction of the clamping force for clamping the receiver 5 on the structure in the retainer 3 on the structure. Identical components have the same reference characters as in FIG. 1. Transmission of the force K for introducing a clamping force between the support flange 51 and the retainer 3 on the structure preferably takes place by mechanical levers or push rods, but it could also take place hydraulically.

Figure 3:
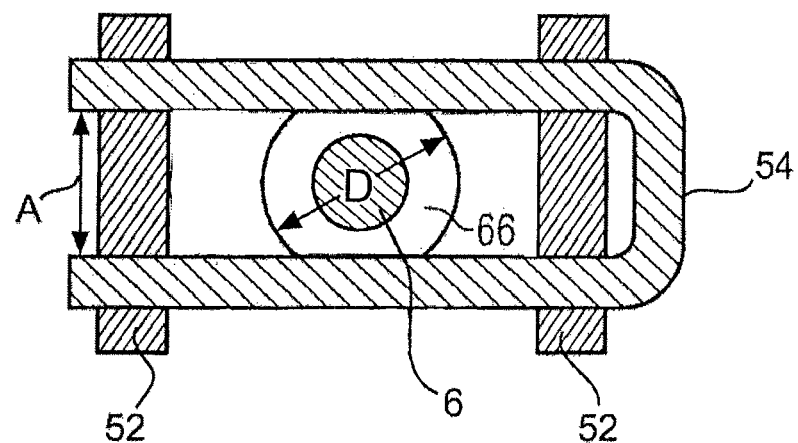
FIG. 3 illustrates schematically a simplified partial cross-sectional view, omitting the cross-sectional view of the cylindrical body 56 of receiver 5, for clarity.

The simplified partial view, shown in FIG. 3, corresponding to the line III-III in FIG. 1 shows how the insertion pin 6 is secured in the receiver 5 on the structure by means of a U-shaped securing clamp 54. To this effect, anchorages 52, which may be upright are provided on the support flange 51. The anchorages 52 comprise flush boreholes through which the two U-limbs of the securing clamp 54 may be placed. Preferably, the diameter of the boreholes matches the limbs of the securing clamp 54 such that a clamping seat is achieved. However, it is also possible for the securing clamp 54 on the two ends of the U-limbs to also be secured against sliding from the anchorages 52. The spacing A between the U-limbs matches the diameter D of the base 66 of the insertion pin 6 such that it is not possible to pull the insertion trunnion out when the securing clamp is in place. Thus, even if the cylindrical body 56 of the receiver 5 on the structure were to be destroyed, either as a result of mechanical failure or as a result of a fire, the insertion pin 6 would be firmly held to the structure by the securing clamp 54. In one example, the securing clamp 54 and the anchorages 52 are preferably made from a metallic material, while the remaining components of the connection element are preferably made from a plastic material, wherein elastomers are particularly well suited. Instead of providing a U-shaped securing clamp 54, individual securing pins may be utilized. In one example, the U-shaped clamp is insertable into the upright anchorage such that a trunnion portion of the insertion pin is capable of being secured in a first recess.

Figure 4:
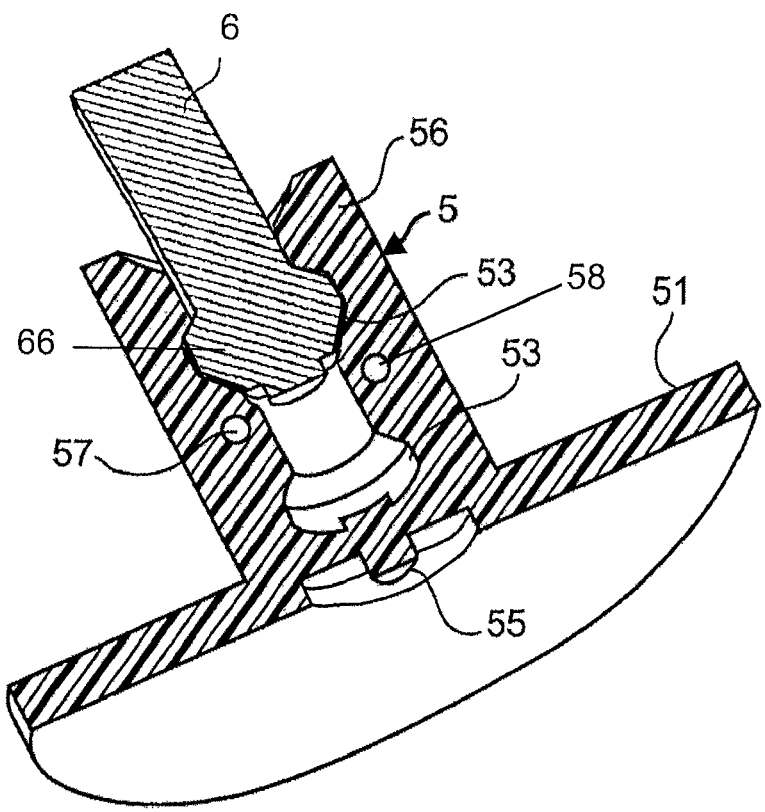
FIG. 4 shows an oblique diagram of the receiver on the structure, with an insertion trunnion snapped into position 1.
Figure 5:
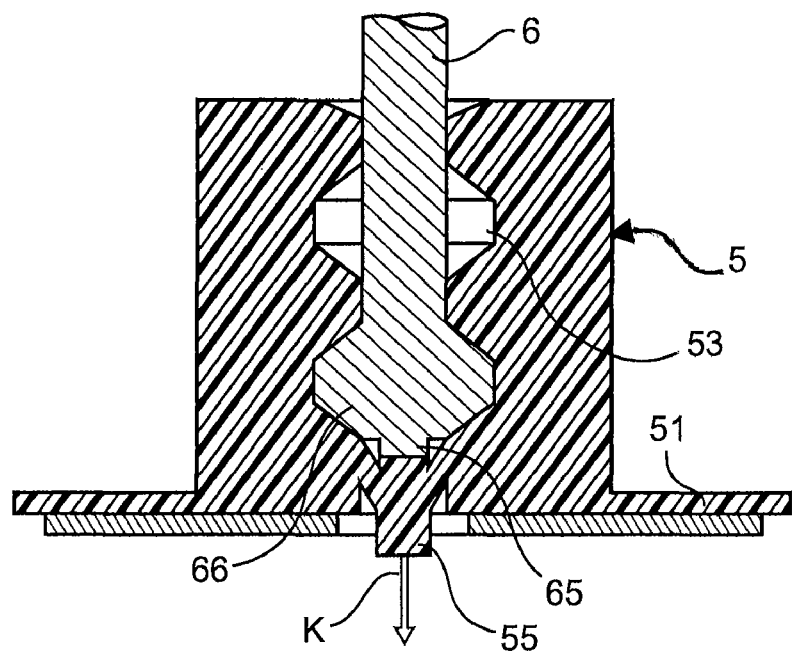
FIG. 5 shows a partial section of the receiver on the structure, in the closed position according to FIG. 1.

The oblique diagram, shown in FIG. 4, of the receiver 5 on the structure, with the insertion pin 6 snapped-in in position 1, as well as the partial section of the receiver 5 on the structure, shown in FIG. 5, both show the pin 65 acting on the base 66 of the insertion pin 6 on the corresponding pin 55 to generate a clamping force K. In the oblique diagram of FIG. 4, the insertion pin 6 is in position 1, i.e. in a position in which the support flange 51 in the flat recess 31 of the retainer 3 on the structure is still slidable in the XY-plane. Consequently, prior to attachment, the receiver 5 on the structure may adapt to a desired position of the component 2 to be attached. Finally, the oblique diagram according to FIG. 4 shows boreholes 57, 58 for accommodating the limbs of the securing clamp 54.

Figure 6:
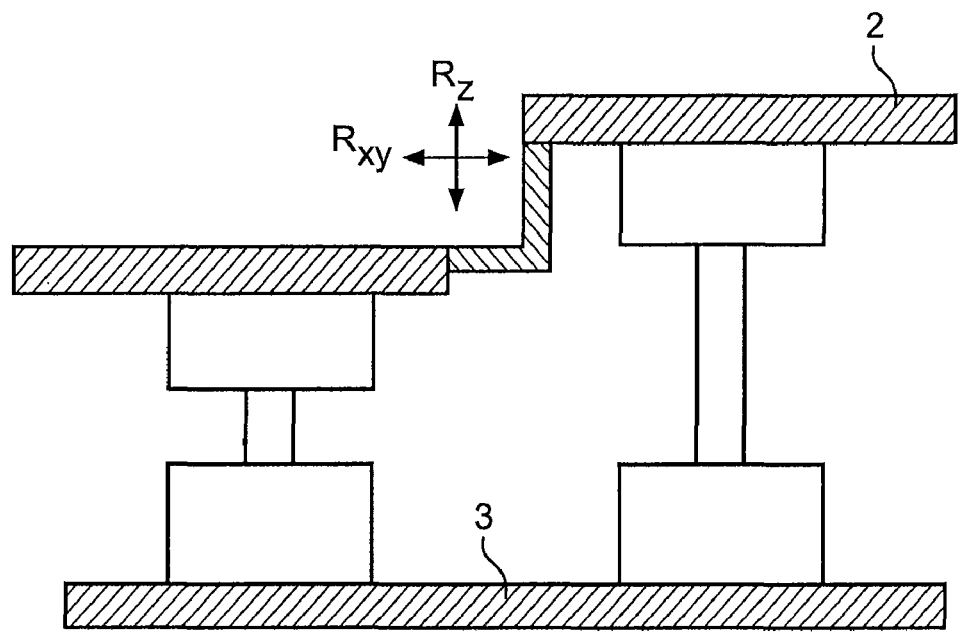
FIG. 6 shows the sequence of attaching a trim part to the structure of an aircraft by means of a connection element corresponding to FIGS. 1 to 4 with positions 1 and 2.

The advantage of precise-fitting installation and attachment of planiform or dish-shaped components by means of the connection elements described is described with reference to the sequence, shown in FIG. 6, for attachment with position 1 and position 2: position 1 is the position in which the insertion point 6 is snapped in, as shown in FIG. 4, in the upper recess 53 of the receiver 5 on the structure.

In this position, the connection element may be displaced in the XY-plane to a limited extent in relation to the retainer 3 on the structure. In this arrangement, an indicator that has been provided, which may be designed to operate mechanically, electrically or electronically, indicates to the installing personnel the necessary displacement of the component 2 to reach a position which in the second position, i.e. in the attachment position of the connecting element, ensures an absolutely precise-fitting connection to already existing construction elements. In the same way, the indicator serves to indicate the spacing of the component 2 in the Z-direction from its final position. If this spacing differs from a specified value to achieve the desired final height in Z-direction in position 2, which is the attachment position on the retainer on the component, or on the anchorage part, the correct height may be set by changing the spacing (screw thread 41) so that after snapping into position 2, the component 2 has attained the desired precise final position.

LIST OF REFERENCE CHARACTERS

1 Structure
2 Trim part (component)
21 Component surface
3 Retainer on the structure
31 Flat recess
32 Retaining plate
35 Mechanical or hydraulic devices
4 Retainer on the component
41 Thread
42 Anchorage part
43 Trunnion retainer
44 Ball socket
5 Receiver on the structure 51 Support flange
52 Anchorages
53 Recesses in 5
54 U-shaped securing clamp
55 Intermediate pin
56 Cylindrical body
57 Boreholes in 56
58 Boreholes
6 Insertion trunnion
65 Pin
66 Base
$R_z$ Direction of connection

The invention claimed is:

1. A connection device for attaching a planiform or dish-shaped component to a supporting structure having a first retainer coupled to the component and a second retainer mounted on the supporting structure, the connection device comprising:
 an anchorage part including a screw thread adapted to couple the anchorage part with the first retainer adjustably in at least a Z-translational direction in relation to a surface of the component when the anchorage part is coupled to the first retainer;
 an insertion pin, including a trunnion portion on a first end and a ball on a second end of the insertion pin opposite of the first end, the ball coupling with the anchorage part as a ball joint, such that the insertion pin is adapted to be adjustable in at least the Z-translational direction in relation to the surface of the component;
 a receiver, the receiver being of an elastically deformable soft material and having a first recess, the first recess being contoured for receiving the trunnion portion of the insertion pin, providing a snap connection between the receiver and the insertion pin and, the receiver includes a support flange capable of coupling with the second retainer mounted to the supporting structure such that the support flange of the receiver fits flat against the second retainer and is to be adjustably held and attachable in an XY-plane substantially perpendicularly in relation to the Z-translational direction; and
 a locking device for locking the support flange within the second retainer, wherein the locking device locks the support flange within the second retainer when activated.

2. The connection device of claim 1, wherein the locking device activates when the trunnion portion of the insertion pin is snapped into the first recess of the receiver.

3. The connection device of claim 1, wherein the receiver includes a second recess contoured for receiving the trunnion portion of the insertion pin and the second recess is disposed at a distance from the first recess in the Z-translational direction, such that when the trunnion portion of the insertion pin is received in the second recess, the support flange remains adjustable in the XY-plane and when the trunnion portion is snapped from the second recess into the first recess, then the locking device locks the support flange in the XY-plane.

4. The connection device of claim 1, wherein the second retainer includes a retention plate and the support flange of the receiver is adapted to be retained by the retention plate.

5. The connection device of claim 1, further comprising a U-shaped clamp, the receiver including an anchor bracket and the U-shaped clamp is insertable into the anchor bracket such that the trunnion portion is secured by the U-shaped clamp and the anchor bracket.

6. The connection device of claim 1, wherein the soft material of the receiver is an elastomer.

7. The connection device of claim 1, wherein the locking device includes an intermediate pin, and the intermediate pin contacts the insertion pin, when the insertion pin is inserted in the first recess, such that the intermediate pin firmly clamps the support flange within the second retainer.

* * * * *